United States Patent
Snyder et al.

[11] 3,774,291
[45] Nov. 27, 1973

[54] EXPLOSIVE BONDING OF TUBES TO FITTINGS

[75] Inventors: Jack T. Snyder; Donald M. McLarty, both of Lakewood; Stephen L. Kenley, Sedalia, all of Colo.

[73] Assignee: The United States of America as represented by the Secretary of the Air Force

[22] Filed: Aug. 4, 1972

[21] Appl. No.: 277,956

[52] U.S. Cl............. 29/421, 29/157.4, 29/470.1, 29/470.5
[51] Int. Cl............................................. B23p 17/00
[58] Field of Search............ 29/421 E, 421, 157.4, 29/470.2, 470.1, 471.1, 470.5

[56] References Cited
UNITED STATES PATENTS

| | | | |
|---|---|---|---|
| 3,343,248 | 9/1967 | Silverman et al. | 29/421 X |
| 3,409,969 | 11/1968 | Simons et al. | 29/157.3 |
| 3,434,194 | 3/1969 | Whittaker et al. | 29/421 |
| 3,503,110 | 3/1970 | Berry et al. | 29/421 X |
| 3,562,897 | 2/1971 | Buchwald | 29/470.1 |
| 3,590,877 | 7/1971 | Leopold | 29/421 X |
| 3,717,925 | 2/1973 | Hardwick | 29/470.1 |

Primary Examiner—Charles W. Lanham
Assistant Examiner—V. A. DiPalma
Attorney—Harry A. Herbert, Jr. et al.

[57] ABSTRACT

A method of explosively joining tubes to fittings by first inserting the tube into a double tapered hole bored in the fitting and then positioning a close fitting wooden dowel having a charge of sheet explosive wrapped therearound in the tube under the tapered area. The double tapered cavity between the outer wall of the tube and the fitting is then evacuated by withdrawing the air therefrom and the explosive is detonated causing the tube to expand radially outward against the wall of the double tapered cavity producing a high integrity bond between the tube and the fitting.

4 Claims, 2 Drawing Figures

Patented Nov. 27, 1973 3,774,291

EXPLOSIVE BONDING OF TUBES TO FITTINGS

BACKGROUND OF THE INVENTION

This invention relates to an improved method of joining a tube to a fitting and, more particularly, the invention is concerned with providing a method of explosively bonding tubes to fittings or tube plates by inserting the tube into a double tapered hole in the fitting and evacuating the cavity between the outer wall of the tube and the double tapered hole in the fitting. An explosive charge is detonated in the tube causing outward radial expansion to the surface configuration of the double tapered hole in the fitting thereby forming a high integrity bond.

The bonding of tubes into tube fittings or tube plates is required in various applications including heat exchangers and transfer lines which are used in boilers, nuclear devices and cryogenic apparatus. Generally a large number of parallel tubes are secured at their ends to a tube plate which is perpendicularly disposed to the longitudinal direction of the tubes. The joints between the tubes and the tube fittings must be leak proof to avoid intermixing of the materials between which the heat is being exchanged.

Heretofore, the most commonly known methods of joining tubes to fixtures or tube plates fall into three categories. The first type joint includes the use of packing between the tube and the tube plate. Packed joints require a degree of skill in assembly to ensure maximum tightness without causing damage to the tubes and the joints tend to loosen after some time in service especially if they are subjected to high pressure differentials. A second type of commonly used joints is the conventional arc or gas welded joint. The welded joint is restricted because the materials of the tubes and tube plate must necessarily be metallurgically compatible. The weld zone often has undesirable metallurgical characteristics and softening of the tubes usually occurs as a result of the temperatures reached during the welding operation. Also, slight variations in the weld thickness can cause unreliability in the joint leading to leakage and failure.

The third category of commonly used joints is the rolled-in joint using an expanding tool. Expanded joints generally require accurately dimensioned openings in the fixture or plate into which the tubes are to be inserted. The particular shape and surface finish of the holes in the tube plate must be precisely controlled in order to properly expand the tube with the expanding tool and obtain satisfactory results. Generally speaking, expanded joints require more time for assembly because the joints must be rolled sequentially. Also, this procedure sometimes produces a complex and undesirable stress pattern in the tubes and tube plate. In order to overcome these drawbacks to the expanded type joint, it would be desirable to secure the tube to the tube plate by using a method which is fast and sure and which does not require a precisely configured hole in the tube plate. Also, no particularly unusual skills or special equipment should be required to economically produce a reliable joint of high integrity.

SUMMARY OF THE INVENTION

The present invention is concerned with providing a method for explosively joining tubes to fittings or tube plates to produce joints which have parent metal strength and suitable for use where dissimilar metals are being joined. A double tapered hole in the fitting is evacuated after the tube has been inserted thereinto. Sheet explosive which has been wrapped around a wooden dowel is inserted into the tube which is then sealed at one end. The explosive is detonated causing the tube to expand radially outward into the evacuated cavity and thereby produce a leakproof high quality joint. Means are provided for protecting the unaffected portion of the tube during the detonation of the explosive. The joint is so designed that the detonation maintains the vacuum between the tube and the fitting to prevent any foreign matter or gases from being entrapped which would tend to degrade the joint as the bond develops through the fitting.

Accordingly, it is an object of the invention to provide a method for explosively bonding a tube to a fitting or tube plate to produce a joint that is leak tight and reliable while being quickly and easily produced.

Another object of the invention is to provide a method for explosively bonding tubes to fittings wherein various combinations of dissimilar metals are used in their fabrication.

Still another object of the invention is to provide a method of explosively bonding tubes to a tube plate without the presence of heat at the joint. The absence of heat prevents the formation of a heat affected zone which would alter the metallurgical properties of the workpieces.

A further object of the invention is to provide a method of joining tubes to fittings wherein a leak tight joint of high strength and integrity is made. The strength is at a high level in either longitudinal direction along the tube.

A still further object of the invention is to provide a method of explosive bonding of tubes to fittings wherein a vacuum is created in a double tapered cavity between the tube and the fitting. The vacuum prevents adiabatic heating of air which would be entrapped as the bond is made and also results in a clean joint free of gas bubbles and foreign matter.

Another still further object of the invention is to provide a method of joining tubes to a tube plate without the use of a rolling tool or other special equipment. No unusual skill or experience is required to practice the invention and achieve good results.

These and other object, features and advantages will become more apparent after considering the following detailed description taken in conjunction with the illustrative embodiment in the accompanying drawings wherein like reference numerals are used throughout to identify like elements.

In the drawings:

FIG. 1 is a view in cross-section of an assembled apparatus for practicing the vacuum explosive bonding method according to the invention; and FIG. 2 is a view in cross-section of a bonded joint produced by the herein disclosed method showing the radially expanded tube fixedly attached to a typical tube fitting.

DESCRIPTION OF A PREFERRED EMBODIMENT

Figure 1:
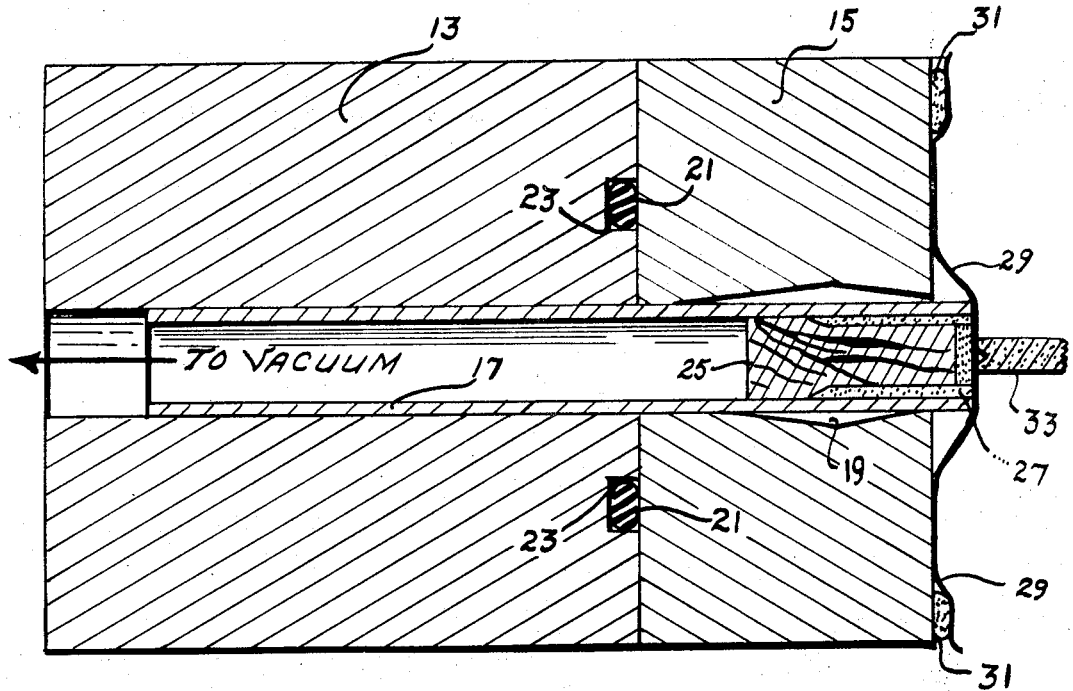

Referring now to the drawings, the hereinafter disclosed method for explosively joining tubes to fittings includes a thick walled cylindrical tube protector 13 and a similarly shaped fitting 15 adjacent the inner end thereof. A piece of tubing 17 is positioned in close fitting axially aligned holes through the central areas of the elements 13 and 15 and extends outwardly beyond the fitting 15. In the fitting 15, the central hole is provided with a double tapered wall section thereby leaving a triangular shaped space 19 between the outer wall of the tubing 17 and the inner wall of the fitting 15.

The adjacent juxtaposed surfaces of the elements 13 and 15 are sealed by providing an O-ring 21 positioned in a groove 23 on the inner surface of the element 13. In the assembled condition, a portion of the O-ring 21 rests tightly against the inner surface of the element 15 to prevent air from passing between the adjacent surfaces into the central area when the vacuum pump attached to the tube protector 13 is in operation. A close fitting wooden dowel 25 having a reduced diameter rearward portion is positioned in the tube 17 near the tapered wall section 19. A charge of sheet explosive 27 is positioned around the reduced diameter section of the dowel 25 in close fitting relationship with the inner surface of the tube 17 and also covers the outer end of the dowel 25. The explosive charge 27 which is flush with the outer end of the tube 17 is then covered with a thin circular sheet of plastic material 29 such as polyvinylchloride which also covers the outer flat surface of the fitting 15 to form an airtight seal and prevent the entrance of air between the tube 17 and the fitting 15. A mastic material such as zinc chromate putty 31 is attached near the outer edge of the flat outer surface of the fitting 15 under the sealing material 29 and serves to aid in forming an airtight seal at the outer end of the tube 17. The detonating cap 33 is placed in intimate contact with the outer surface of the polyvinylchloride film 29 in the region of the explosive charge 27 which is detonated through the film 29.

Figure 2:
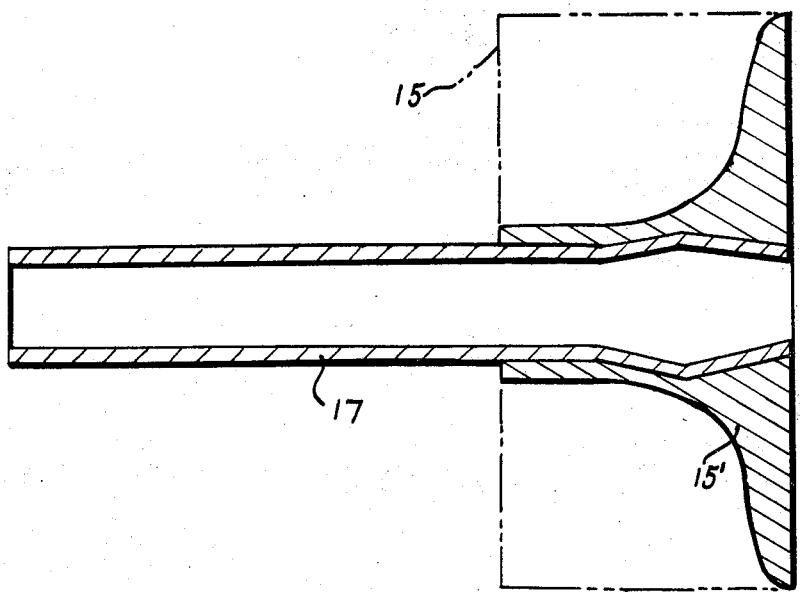

In FIG. 2, there is shown a cross section of a finished joint according to the invention showing the tubing 17 outwardly expanded into the double tapered space in the fitting 15'. The fitting 15' has been machined to a typical finished configuration and the original shape (shown in FIG. 1) is shown in phantom. The joint produced by employing the herein disclosed method will have parent metal strength because the tubing is mechanically locked in place in the shallow, double tapered notch 19 inside the fitting 15' without using heat or unduly stressing the tube material. The invention is equally suitable for use in attaching tubes to a tube plate in which the double tapered holes have been machined.

MODE OF OPERATION

In operation, the explosively joined tube and fitting is produced by first placing the fitting element 15 and the tube protector 13 in a juxtaposed side-by-side relationship with their central openings in axial alignment. The tube 17 is then inserted into the central opening of the fitting 15 and pushed through into the central opening in the tube protector 13 until the back end of the tube 17 protrudes a small distance beyond the outer flat surface of the fitting 15. The dowel 25 with the explosive 27 wrapped therearound is then inserted into the back end of the tube 17 until it is flush therewith. The putty 31 is attached around the outer edge of the surface of the fitting 15 and then the polyvinylchloride film 29 is positioned over the entire flat exposed surface of the fitting 15 including the end of the tube 17 and the explosive charge 27. The detonator cap 33 is then placed against the film 29 adjacent the explosive charge 27.

The front end of the tube projector 13 with the tube 17 therein is then operatively connected to a vacuum pump (not shown) and a vacuum is created which draws the air out of the double tapered region 19. The cap 33 carries the explosive charge 27 to detonate which immediately produces an enlarging of the outer end of the tube 17 thereby sealing the cavity 19 so that the vacuum can be maintained. This initial expansion also prevents any foreign materials or gas from being entrapped in the cavity 19 which would tend to degrade the joint as the bond progresses through the fitting. The evacuation of the cavity 19 also prevents adiabatic heating of the air which would be entrapped as the bond is made. The heating would cause melting of the metal in the joint, large gas pockets which cause leakage problems, possible fracturing of the tubing and general degradation of the joint.

Although the invention has been illustrated in the accompanying drawings and described in the foregoing specification in terms of a preferred embodiment thereof, the invention is not limited to this embodiment or to the preferred configuration mentioned. It will be apparent to those skilled in the art that our invention could have extensive use in other operations where it is desirable to bond tubes to tube plates for heat exchangers and transfer lines which are used in boilers, nuclear devices and cryogenic apparatus particularly where there is a requirement for dissimilar metal joints. Also, the method is suitable for bonding ultra thin wall tubing (0.003 to 0.010 inch) to heavy flanges for glass overwrap to produce parts for liquid hydrogen transfer lines.

Also, it should be understood that various changes, alterations, modifications, and substitutions particularly with respect to the construction details can be made in the arrangement of the several elements without departing from the true spirit and scope of the appended claims.

Having thus described our invention, what we claim and desire to secure by Letters Patent of the United States is:

1. A method of joining a tube to a tubing fixture comprising the steps of:
   juxtapositioning a thick walled cylindrical tube protector beside the tube fitting such that central holes therethrough are axially aligned, the tube fitting having a double tapered cavity in the wall portion of its central hole;
   sealing the adjacent faces of the tube protector and the tube fitting to prevent air from passing therebetween;
   inserting the tube through the central hole in the tube fitting and into the tube protector, a portion of the tube protruding outwardly from the outer face of the fitting;
   inserting a close fitting dowel having a charge of sheet explosive wrapped therearound and covering the outer surface thereof, the dowel with sheet explosive attached being positioned under the double tapered cavity flush with the outer end of the tube;
   sealing the outer face of the tube fitting to prevent passage of air into the central hole;
   evacuating the air from the double tapered cavity in the inner wall of the tube fitting through the forward end of the central hole in the tube protector; and detonating the explosive charge through the outer seal to produce radial expansion of the tube against the wall of the evacuated double tapered cavity in the tube fitting and thereby produce a clean bonded joint of high integrity between the tube and the tube fitting.

2. A method according to claim 1 wherein the step of sealing the adjacent faces of the tube protector and tube fitting includes a groove of predetermined width and depth in the face of said tube protector and an O-ring positioned in said groove such that said O-ring makes pressure contact with the bottom of said groove and the surface of said tube fitting.

3. A method according to claim 1 wherein the step of sealing the outer surface of the tube fitting includes a sheet of polyvinylchloride film positioned over the outer exposed surface of the tube fitting covering the end of the tube and the explosive charge as well.

4. A method according to claim 1 wherein the step of detonating the explosive charge proceeds in the tube from the outer and toward the inner end such that the initial detonation operates to seal off the outer end of the tube to maintain the vacuum during the entire detonation process.

* * * * *